United States Patent
Clement

(10) Patent No.: US 8,393,750 B2
(45) Date of Patent: Mar. 12, 2013

(54) EXTENDABLE STROBE LIGHT DEVICE

(76) Inventor: Parley A. Clement, Richland, WA (US)

(*) Notice: Subject to any disclaimer, the term of this patent is extended or adjusted under 35 U.S.C. 154(b) by 686 days.

(21) Appl. No.: 12/553,934

(22) Filed: Sep. 3, 2009

(65) Prior Publication Data

US 2011/0051214 A1 Mar. 3, 2011

(51) Int. Cl.
*F21L 4/04* (2006.01)
(52) U.S. Cl. ... 362/198; 362/188; 362/191; 362/249.03; 362/249.07; 362/249.09; 362/285; 362/418; 362/419; 362/430; 362/431; 340/468; 340/471; 340/472; 340/473; 116/202
(58) Field of Classification Search ............... 362/188, 362/191, 198, 249.03, 249.07, 249.09, 285, 362/286, 418, 419, 430, 431; 340/468, 471–473; 116/202
See application file for complete search history.

(56) References Cited

U.S. PATENT DOCUMENTS

| | | | | |
|---|---|---|---|---|
| 1,398,011 A * | 11/1921 | Errington | .................. | 362/387 |
| 3,128,448 A * | 4/1964 | Shumer et al. | .................. | 340/472 |
| 3,439,326 A * | 4/1969 | Boudin | .................. | 340/472 |
| 3,797,813 A * | 3/1974 | Roesel | .................. | 266/54 |
| 4,065,806 A * | 12/1977 | Satoh | .................. | 362/419 |
| 4,222,811 A * | 9/1980 | Enders | .................. | 156/406 |
| 4,870,543 A * | 9/1989 | Born et al. | .................. | 362/542 |
| 5,072,345 A * | 12/1991 | Goggia | .................. | 362/153.1 |
| 5,337,226 A * | 8/1994 | Wang et al. | .................. | 362/198 |
| 5,398,026 A * | 3/1995 | Handsaker | .................. | 340/984 |
| 7,476,006 B2 * | 1/2009 | Hinds | .................. | 362/286 |
| 7,651,242 B1 * | 1/2010 | Guerrant | .................. | 362/286 |
| 7,887,408 B2 * | 2/2011 | Walker et al. | .................. | 463/20 |
| 8,134,463 B2 | 3/2012 | Black | | |
| 2007/0014116 A1* | 1/2007 | Yoshimori et al. | .................. | 362/386 |
| 2010/0053944 A1* | 3/2010 | Yao-Lin | .................. | 362/198 |

* cited by examiner

*Primary Examiner* — Mary McManmon
(74) *Attorney, Agent, or Firm* — Frank J. Dykas; Dykas & Shaver

(57) ABSTRACT

The extendable strobe light device (1) comprises a telescoping light mount (10) bearing a strobe light (11). By manual operation or by power to an antenna drive motor (23) the telescoping light mount (10) is extended or retracted. An insulated electrical conductor (28) provides power to the strobe light (11). The insulated electrical conductor (28) is wound on a negator reel (46). A negator spring reel assembly (32) contains a negator spring (400) retracts the insulated electrical conductor (28) when the telescoping light mount (10) is retracted. An electrical brush assembly (43) comprises a brush assembly insulated housing (52) composed of a rigid material including metals and plastics. The brush assembly insulated housing (52) is affixed to the case by screws or bolts (34).

3 Claims, 5 Drawing Sheets

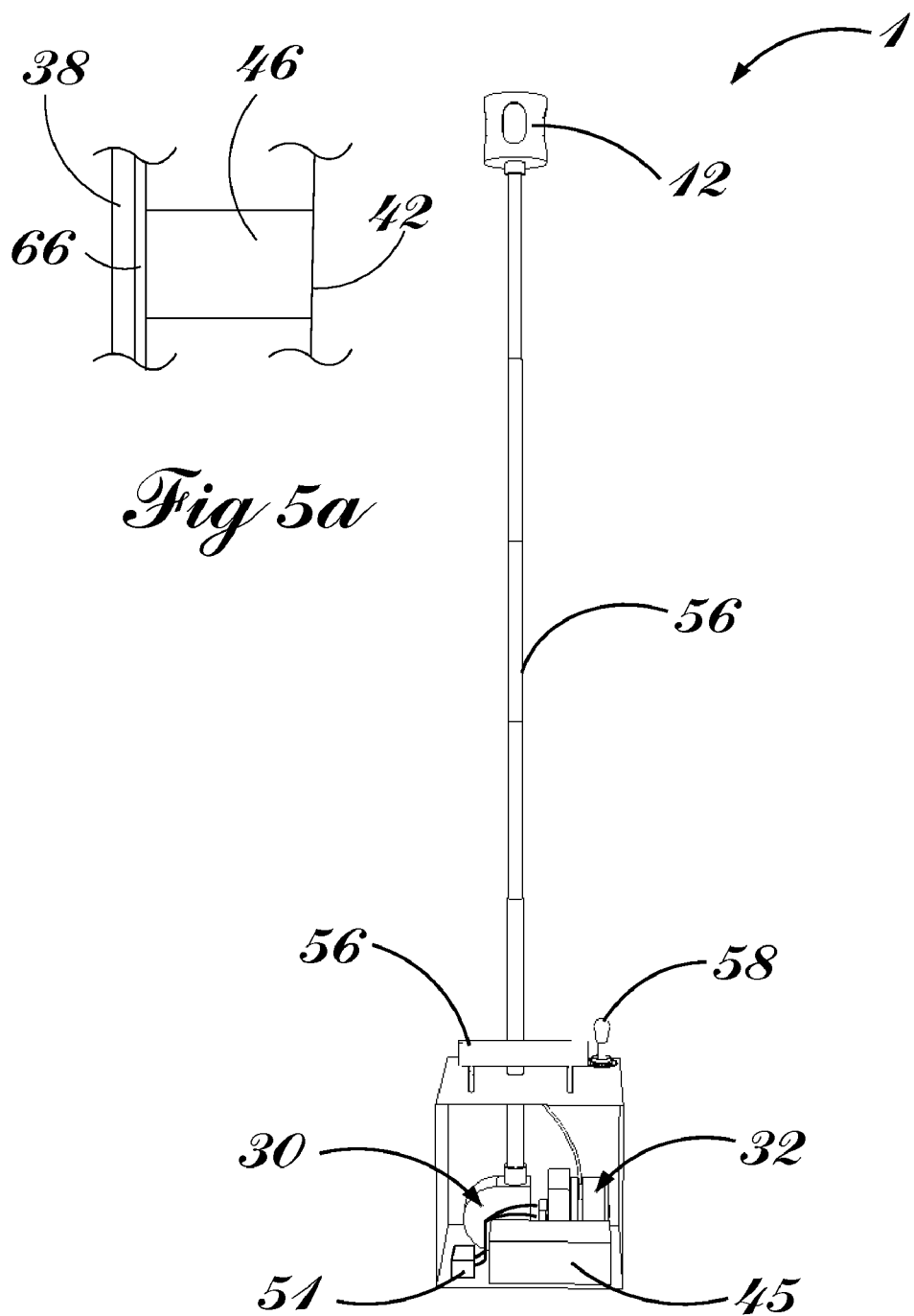

EXTENDABLE STROBE LIGHT DEVICE

FIELD OF THE INVENTION

This invention relates to a warning apparatus providing an extendable or telescoping strobe light to provide an easily viewed safety alert.

BACKGROUND OF THE INVENTION

Auto accident scenes pose hazards to oncoming traffic and are frequently marked with warning flares having limited burn time. Smaller mobile vehicles, such as wheelchairs and all terrain vehicles, are found in traffic, are not as visible in profile as other motor vehicles and may be adorned with flashing warning lights.

Warning light devices are seen in U.S. Pat. No. 7,367,700 to Chasmar; U.S. Pat. No. 7,026,940 to Cherubini; U.S. Pat. No. 6,154,690 to Coleman; U.S. Pat. No. 5,791,761 to Bryant et al; and U.S. Pat. No. 6,035,567 to Cameron.

The patents referred to herein are provided herewith in an Information Disclosure Statement in accordance with 37 CFR 1.97.

SUMMARY OF THE INVENTION

The Apparatus (1), presents a strobe light (11) via an telescoping light mount (10). The telescoping light mount (10) is extended and retracted by an antenna drive motor (23) and alternatively manually. An insulated electrical conductor (28) is connected to a strobe or light socket (5) which is in electrical communication with the strobe light (11). The insulated electrical conductor (28) is wound on a negator reel (46) which is integral to negator spring reel assembly (32). A negator spring housing (420) contains a negator spring (400). When the telescoping light mount (10) is extended manually or by the antenna drive motor (23), and thereby unwinds the insulated electrical conductor (28), the negator spring (400) is spring biased exerting a retracting force on the insulated electrical conductor (28). When the antenna drive motor (23) retracts the telescoping light mount (10) the spring biased negator spring (400) returns to its relaxed position thereby reeling in and rewinding the insulated electrical conductor (28) on the negator reel (46).

BRIEF DESCRIPTION OF THE DRAWINGS

The foregoing and other features and advantages of the present invention will become more readily appreciated as the same become better understood by reference to the following detailed description of the preferred embodiment of the invention when taken in conjunction with the accompanying drawings, wherein:

FIGS. 1 and 1A illustrate the assembly (1) showing the telescoping rod (10), luminaire (12), which comprises a light socket (5) and strobe light (11), a manually portable case (14) with case door (13), a case bracket (15) affixing the assembly (1) to a vehicle, the negator spring reel assembly (32), power supply (29) shown here as from an external source, drive motor (23) and strobe circuit and power (51).

FIG. 5 illustrates an alternative embodiment of the extendable strobe light device (1) showing in addition to the views of FIGS. 1 and 2 general power (45), generally as a battery, within the case (14), strobe circuit and power (51) strobe power cable (53), electrical switch (58), and handle (56).

FIG. 5A is a detail side elevation from FIG. 2 showing the negator reel gap (44), negator reel (46) and conducting plate (66).

DETAILED DESCRIPTION

Figure 1:
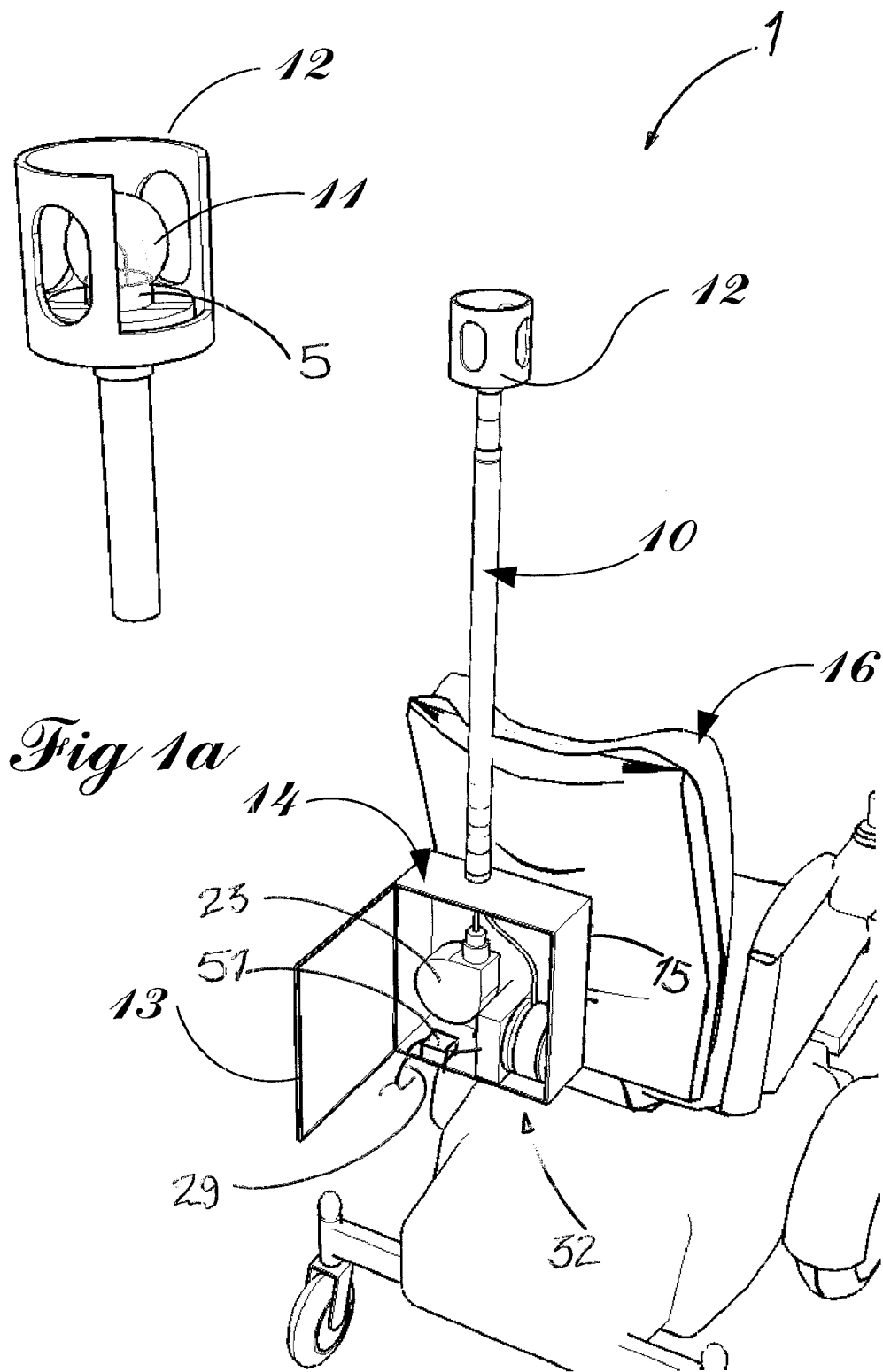
Figure 2:
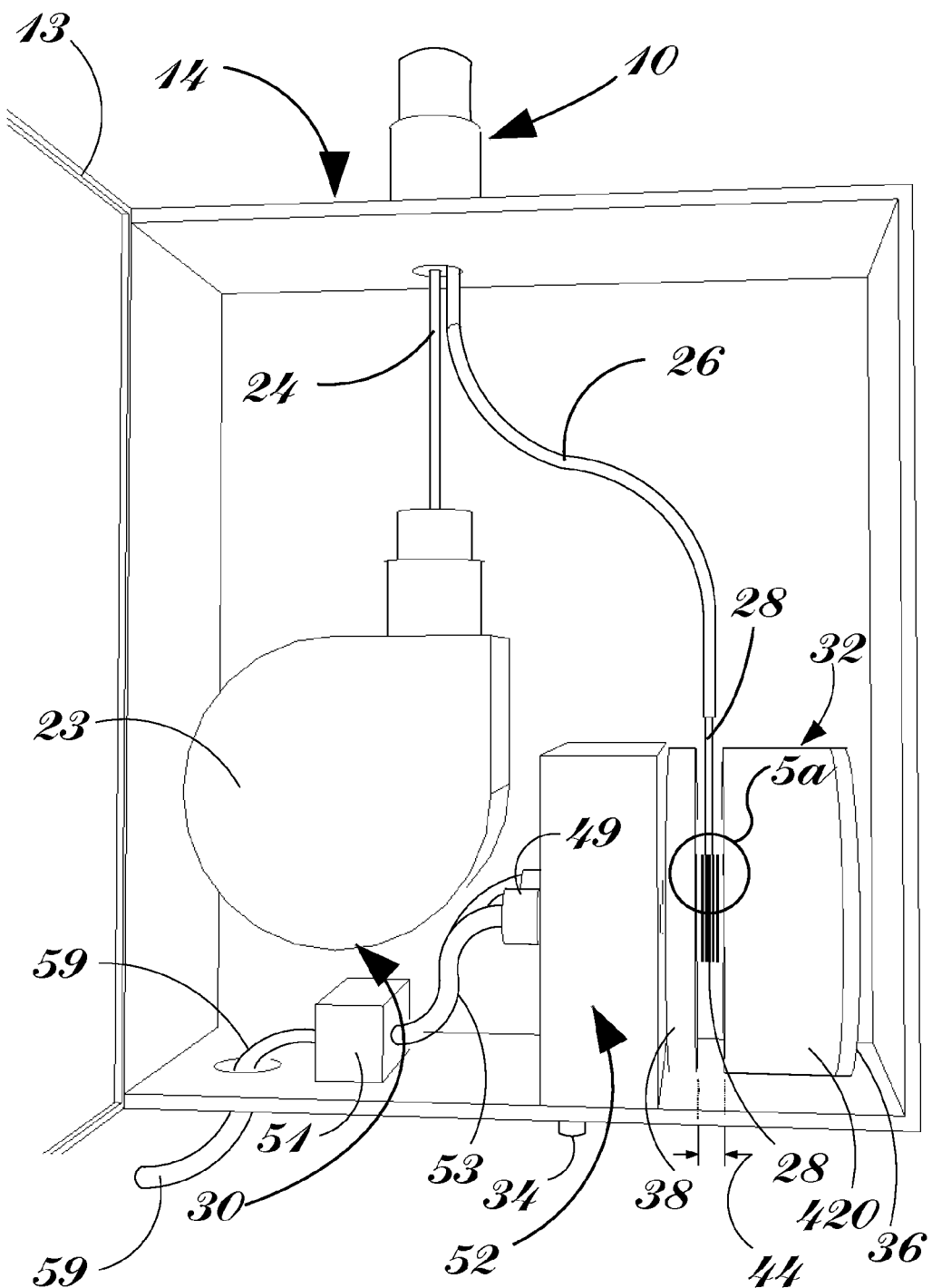
FIG. 2 shows the extendable strobe light device (1), telescoping light mount (10), cover (13), case (14), antenna drive motor (23), antenna drive wire (24), conductor conduit (26), insulated electrical conductor (28), negator spring reel assembly (32), negator spring housing (420), negator reel gap (44), negator reel assembly (38), negator spring reel housing cap (36), brush assembly insulated housing (52), general power (45), strobe circuit and power (51) and strobe power cable (53).

FIGS. 1, 2 and 5 illustrate an extendable/retractable illuminating device assembly (1) shown contained in a manually portable case (14) with a case door (13). A manually portable case (14) is a case that is constructed of a size and out of materials such that it is readily carried by a person of average strength and ability. The case (14) and door (13) will generally be constructed of a rigid material including metals. The door (13) is hinged or otherwise connected to the case (14) by a means recognized by those of ordinary skills in case arts. It is recognized, by those of ordinary skill in the mechanical and container arts, that there will be many containers with various configurations including different means of access and constructed of generally rigid materials including metals and plastics. A tubular telescoping rod (10), with a distal end and an attachment end extends outwardly from the case (14), and is attached to the case at the attachment end. At the distal end, the telescoping rod (10), is fitted with a luminaire (12). In the preferred embodiment, the luminaire (12) comprises a strobe light (11). The luminaire (12) is in electrical communication with an insulated electrical conductor (28) which is extended or unwound from a reel provided by a negator spring reel assembly (32).

One embodiment of the assembly (1), seen in FIG. 5, contains a power supply (45) comprised generally of a DC battery. This embodiment, with a handle (56), is portable and may be used by officers at accident scenes in the place of flares. The assembly (1) will have an operating time exceeding the burn time of a highway warning flare. In one embodiment, the telescoping rod (10) will be manually extended and retracted. In another embodiment, the telescoping rod will be extended and retracted with a drive means (30), controlled with a switch (58). FIG. 1 shows an embodiment of the invention which will generally be affixed to a vehicle via a case bracket (15). The case bracket (15) is understood by those of ordinary skills in bracket arts to have many variations. Also seen is a strobe circuit and power supply (51), understood to comprise the electronic circuit required to produce an electronic output as required for the operation of a strobe light (11). Seen is an electrical switch (58) between the power supply (45) and the strobe circuit and power supply (51).

Figure 3:
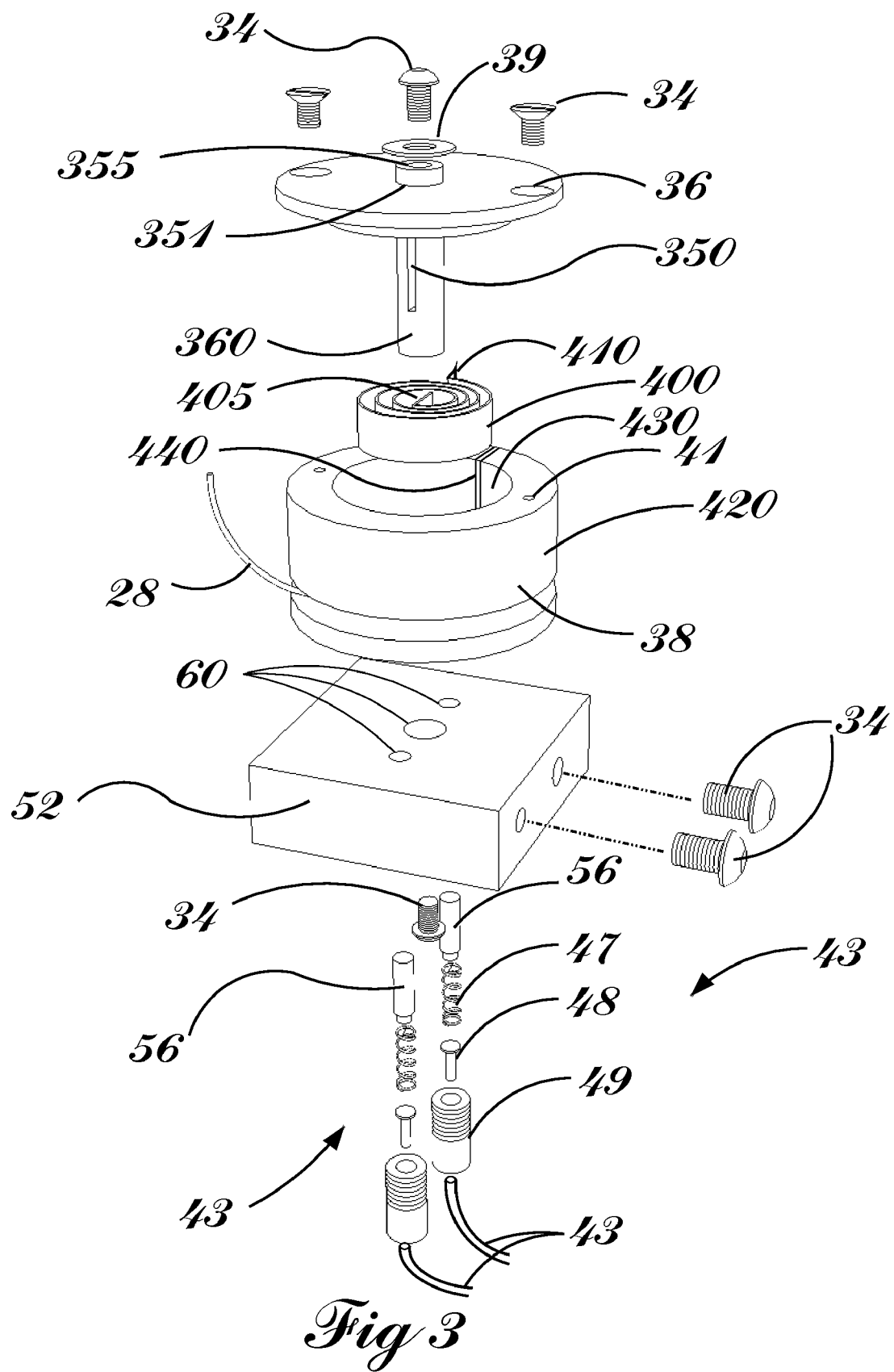
FIG. 3 is an exploded view of the negator spring reel assembly (32) and the brush assembly (43). Seen is the negator spring reel assembly (32) with a negator spring housing (420), a negator reel gap (44), negator reel assembly (38), a negator reel (46), negator axle (35), negator spring (40), negator spring reel housing cap (36), screw or bolt means (34), insulated electrical conductor (28). Also illustrated is the brush assembly (43) with at least one brush assembly carbon (56), at least one brush assembly spring (47), at least one brush assembly pin (48), a brush assembly insulated housing (52), at least one brush assembly connector (49), at least one brush assembly insulated housing apertures (60) and at least one strobe power cable (53).
Figure 4:
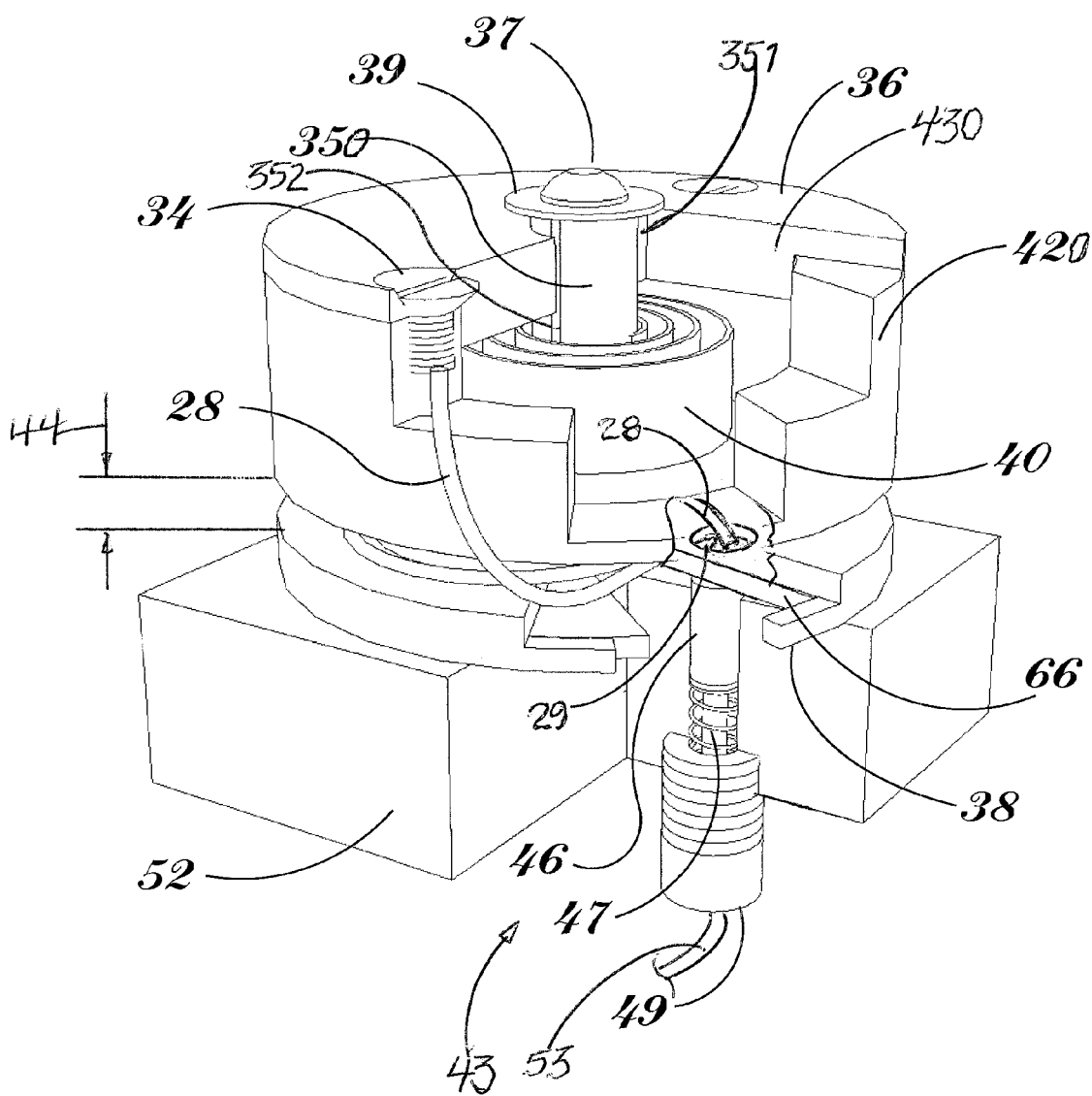
FIG. 4 is a section view from FIG. 3 of the negator spring reel assembly (32) showing the negator spring housing (420), negator reel gap (44), negator reel assembly (38), negator axle (35), conducting plate (66), negator spring (40), negator spring reel housing cap (36), screw or bolt means (34), insulated electrical conductor (28) and conductor affixing means (29). Also illustrated is the brush assembly (43) with at least one brush assembly carbon (56), at least one brush assembly spring (47), at least one brush assembly pin (48), a brush assembly insulated housing (52), at least one brush assembly connector (49), at least one brush assembly insulated housing apertures (60) and at least one strobe power cable (53).

FIGS. 3, 4 and 5A illustrate the negator spring reel assembly (32) and brush assembly (43). The negator spring reel assembly (32) is comprised of a negator spring housing (420) which is integral with a negator reel assembly (38) by the interconnection via a hollow negator reel (46) and is composed, in the preferred embodiment, of rigid materials including metals and plastics.

The negator spring housing (420) encloses a cavity which is sized to receive a coil spring (40). The negator spring housing (420) is closed or capped, distal to the negator reel assembly (38), by a generally planar negator spring reel housing cap (36) which is fastened by screw or bolt means (34) to the negator spring housing (420) via threaded apertures. The negator spring reel housing cap (36) has a centrally positioned negator axle aperture (351) which is sized and shaped to receive an elongated and cylindrically shaped negator axle (350). The negator axle (350) extends from the negator spring reel housing cap (36) negator axle aperture (351) through a hollow negator reel (46) and into or proximal to a brush housing aperture (60) where the negator axle (350) is secured from rotation by screw or bolt means (34) through a brush housing aperture (60) and into a screw/bolt aperture in the negator axle (350). It is seen that the negator axle (350) remains stationary relative to the rotation of the negator reel assembly (38) and the negator spring housing (420).

The negator axle (350) is secured from rotation relative to the negator reel assembly (38) by screw or bolt means (34) through a brush housing aperture (60) and into a screw/bolt aperture in the negator axle (350). The negator axle (350) is secured from rotation relative to the negator spring housing (420) and negator spring reel housing cap (36) by screw or bolt means (34) through a bearing means (39) and through the negator axle aperture (351) and into a screw/bolt aperture in the negator axle (350). The bearing means (39), illustrated in FIG. 3, may be provided by a washer.

The negator reel assembly (38) has, most distal to the negator spring reel housing cap (36), a conducting plate (66) comprising an electrical conducting material generally copper. Those of ordinary skills in the electrical conducting arts will recognize that other materials will provide an equivalent conduction characteristic. The conducting plate (66) is generally planar, is rotationally secured to the negator reel assembly (38) and may be inset in the negator reel assembly (38). The conducting plate (66) is immediately proximal to a brush assembly insulated housing (52).

The negator reel (46) is generally cylindrical and interconnects the negator spring housing (420) and the negator reel assembly (38). The negator spring housing (420), the negator reel (46) and the negator reel assembly (38) will generally be formed from metal or plastic as an integral unit. An insulated electrical conductor (28) is wound around the negator reel (46). The insulated electrical conductor (28) is in electrical communication between the light socket (5) and the conducting plate (38). The insulated electrical conductor (28) is affixed by conductor affixing means (29) to the conducting plate (66) by screw, bolt/nut, solder or welding means as shown in FIG. 4.

The negator spring (400) has a negator spring inside end (405) and a negator spring outside end (410), as seen in FIG. 3 and is, in the preferred embodiment a coil spring. The negator spring inside end (405) is centrally positioned within the negator spring housing (420). The negator axle (350) has a negator axle slot (352), centrally and longitudinally positioned from the negator axle distal end (355) at or proximal to the negator spring reel housing cap (36), into which is received the negator spring inside end (405). The negator spring housing (420) has a negator spring housing inside wall slot (440) into which is received the negator spring outside end (410). The negator spring (400) is biased into tension or compression as the negator reel assembly (38) rotates to release the insulated electrical conductor (28) when the telescoping light mount (10) is extended. The biased negator spring (400) reverses the rotation of the negator spring reel assembly (32) when the telescoping light mount (10) is retracted thus rewinding the insulated electrical conductor (28) about the negator reel (46).

FIGS. 1, 2 and 5 illustrate the telescoping rod (10) which may be extended and retracted manually or by operation of a drive motor (23) which, for extension, forces outwardly an antenna drive wire (24). Those of ordinary skills in antenna drive motors (23) will recognize a variety of such drive motors which urge a stiff wire or cable, which is affixed distally to the telescoping rod (10), to either extend or retract the telescoping rod (10). In the preferred embodiment, a conductor conduit (26) is positioned between the negator spring reel assembly (32) and the telescoping light mount (10) at a location proximal the interconnection of the telescoping light mount (10) and the case (14). The insulated electrical conductor (28) passes through the conductor conduit (26) and is thus shielded from wear from contact with the antenna drive wire (24). The conductor conduit (26) is affixed by conduit affixing means including wire ties, clamps and other such means known to those of ordinary skill in the conduit affixing arts.

The negator spring reel assembly (32) is cylindrical in the preferred embodiment. The negator reel (46) separates the negator spring housing (420) and the negator reel assembly (38) by a space identified here as the negator reel gap (44) as seen in FIGS. 2 and 4.

Seen in FIGS. 2, 3 and 4 is a brush assembly (43) which provides electrical communication between an internal power supply (45) or power from an external source via a power cable (46) connected, for example, to a vehicle battery. The brush assembly (43) is comprised of at least one brush assembly carbon (56), at least one brush assembly spring (47), at least one brush assembly pin (48) movably positioned in the at least one brush assembly insulated housing (52) within at least one brush assembly insulated housing apertures (60) in electrical with the at least one brush assembly connector (49). The at least one brush assembly pin (48) is elongated terminating in a substantially planar end which exerts force on the at least one brush assembly spring (47) which in turn exerts force on the at least one brush assembly carbon (56) which is urged into electrical contact with the rotatable conducting plate (66). In the preferred embodiment there are at least two brush assembly carbons (56). The at least one brush assembly connector (49) is connected by cable connecting means to a strobe power cable (53) which provides strobe power from a strobe circuit and power (51). The at least one brush assembly carbon (56) is understood by those of ordinary skills in the electrical brush assembly arts to be composed primarily of carbon.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

I claim:

1. A manually portable, retractable illuminating device comprising: a manually portable case; a tubular telescoping rod, having a distal end and an attachment end, affixed at its attachment end to said manually portable case, said telescoping rod selectively positionable between an extended position and a retracted position, and defining a tubular passageway from the attachment end to the distal end; a luminaire attached to the distal end of said telescoping rod; an electrical power supply means positioned within said manually portable case; and flexible conducting means, for electrical communication between said luminaire and said power supply means within said tubular passageway; a drive means for retracting and raising said telescoping rod; and a separate spooling means for retracting and spooling said conducting means;

wherein said spooling means further comprises: a negator spring reel assembly comprised of a negator spring housing which is integral with a negator reel assembly and is comprised of rigid material; said negator spring housing being closed or capped distal to the negator reel assembly; a negator spring reel housing cap with a centrally positioned negator axle aperture that is sized and shaped to receive an elongated and cylindrically shaped negator axle; said negator axle extending from said negator axle aperture through said hollow negator reel and into a brush housing aperture wherein the negator axle is secured from rotation, such that the negator axle remains stationary relative to the rotation of the negator reel assembly and the negator spring housing; said negator axle is secured from rotation relative to the negator spring housing and negator spring reel housing cap; said negator reel assembly has, most distal to the negator spring reel housing cap, a conducting plate comprised of an electrical conducting material; said conducting plate being planar and rotationally secured to the negator reel assembly; said conducting plate being immediately proximal to a brush assembly; said negator reel being cylindrical and interconnecting the negator spring housing and the negator reel assembly; said negator reel housing, negator reel, and negator reel assembly being formed from rigid material as an integral unit; said flexible conducting means comprised of an insulated electrical conductor and wound around the negator reel; said insulated electrical conductor providing electrical communication between said luminaire and the conducting plate; said insulated electrical conductor being affixed to the conducting plate; said negator spring comprises a coil spring; said negator spring biased out of tension as the negator reel assembly rotates to spool the insulated electrical conductor when said telescoping rod is retracted, thus winding the insulated electrical conductor about the negator reel; said negator spring biased into tension and reverses rotation of the negator spring reel assembly when said retraceable member is extended, thus unwinding the insulated electrical conductor from the negator reel; said brush assembly comprised of an insulated housing with at least one brush assembly aperture; said brush assembly having at least one brush assembly carbon, at least one brush assembly spring, and at least one brush assembly pin, all of which are movably positioned in a said brush assembly aperture and are in electrical communication with at least one brush assembly connector; at least one power cable interconnecting, and providing electrical communication between, the at least one brush assembly connector and said electric power supply means; and said brush assembly carbon in electrical communication with said conducting plate.

2. The manually portable, retractable illuminating device of claim 1 wherein said luminaire comprises a strobe light.

3. The manually portable, retractable illuminating device of claim 1 wherein said electrical power supply comprises a DC power supply housed in said case.

* * * * *